(12) United States Patent
Virtanen et al.

(10) Patent No.: US 10,316,389 B2
(45) Date of Patent: Jun. 11, 2019

(54) HYDROMETALLURGICAL TREATMENT OF ANODE SLUDGE

(71) Applicant: OUTOTEC (FINLAND) OY, Espoo (FI)

(72) Inventors: Henri Virtanen, Pori (FI); Sönke Schmachtel, Pori (FI)

(73) Assignee: OUTOTEC (FINLAND) OY, Espoo (FI)

( * ) Notice: Subject to any disclaimer, the term of this patent is extended or adjusted under 35 U.S.C. 154(b) by 252 days.

(21) Appl. No.: 15/313,748

(22) PCT Filed: May 27, 2015

(86) PCT No.: PCT/FI2015/050366
§ 371 (c)(1),
(2) Date: Nov. 23, 2016

(87) PCT Pub. No.: WO2015/181446
PCT Pub. Date: Mar. 12, 2015

(65) Prior Publication Data
US 2017/0198370 A1    Jul. 13, 2017

(30) Foreign Application Priority Data
May 28, 2014  (FI) ..................... 20145484

(51) Int. Cl.
*C22B 3/08* (2006.01)
*C22B 3/10* (2006.01)
(Continued)

(52) U.S. Cl.
CPC .............. *C22B 11/042* (2013.01); *C22B 3/06* (2013.01); *C22B 3/08* (2013.01); *C22B 3/10* (2013.01);
(Continued)

(58) Field of Classification Search
CPC .. C22B 3/08; C22B 3/10; C22B 7/007; C22B 11/042
See application file for complete search history.

(56) References Cited

U.S. PATENT DOCUMENTS

| 4,002,544 A | 1/1977 | Heimala et al. |
| 4,094,668 A | 6/1978 | Yannopoulos et al. |

(Continued)

FOREIGN PATENT DOCUMENTS

| CN | 101434385 A | 5/2009 |
| WO | WO 2005/028686 A1 | 3/2005 |

OTHER PUBLICATIONS

Search Report issued by the Chilean Patent Office in corresponding Chilean Patent Application No. 201603004 dated Aug. 14, 2018 (8 pages).

(Continued)

*Primary Examiner* — Tima M McGuthry-Banks
(74) *Attorney, Agent, or Firm* — Buchanan, Ingersoll & Rooney PC

(57) ABSTRACT

The present invention provides a method of separating precious metals from anode sludge obtained from copper electrolysis, comprising (a) leaching the anode sludge in an aqueous sulfuric acid solution to remove leachable chlorides and to obtain a first leaching residue depleted of chlorides; (b) pressure leaching the first leaching residue to dissolve Ag and Se and to obtain a first filtrate comprising Ag and Se and a second leaching residue depleted of Ag and Se; and (c) leaching the second leaching residue with an aqueous hydrochloric acid solution to dissolve Au and PGMs to obtain a second filtrate comprising Au and PGMs and a final leaching residue.

21 Claims, 1 Drawing Sheet

(51) Int. Cl.
*C22B 3/46* (2006.01)
*C22B 7/00* (2006.01)
*C22B 3/00* (2006.01)
*C22B 3/06* (2006.01)

(52) U.S. Cl.
CPC .............. *C22B 3/46* (2013.01); *C22B 7/007* (2013.01); *Y02P 10/214* (2015.11); *Y02P 10/234* (2015.11)

(56) References Cited

U.S. PATENT DOCUMENTS 4,389,248 A * 6/1983 Iio ..................... C01B 19/004
75/418
2007/0062335 A1* 3/2007 Lindroos ................ C22B 1/06
75/418

OTHER PUBLICATIONS

International Search Report (PCT/ISA/210) dated Sep. 2, 2015, by the Finnish Patent Office as the International Searching Authority for International Application No. PCT/FI2015/050366.

* cited by examiner

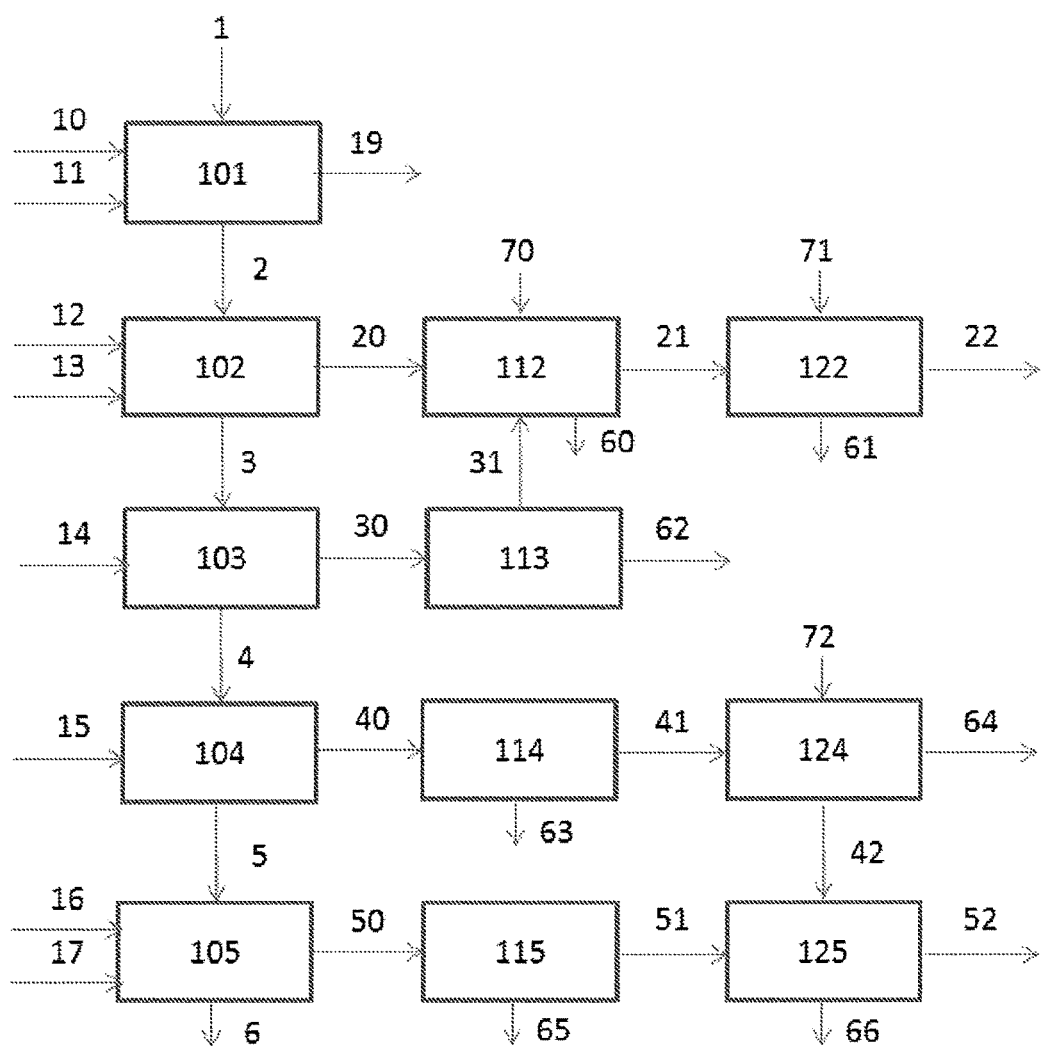

HYDROMETALLURGICAL TREATMENT OF ANODE SLUDGE

FIELD OF THE INVENTION

The present invention relates to hydrometallurgical treatment of anode sludge, and more particularly to a method of separating precious metals from anode sludge obtained from copper electrolysis.

BACKGROUND OF THE INVENTION

Known hydrometallurgical methods for separating the precious metals from anode sludge are based on the use of nitric acid, because the solubility of silver as nitrate is high. However, hydrometallurgical processes based on the use of nitrates for treating anode sludge are not compatible with the rest of the electrolytic process, because the electrolytic refining of copper is carried out in a sulfate solution. In addition, the nitrate bearing sludge must be mechanically ground finer, in order to make the leaching successful.

From the publication Hoffman et al. Proceedings Copper 95, International Conference Vol. III, 1995, pp. 41-57, is known a method for processing anode sludge obtained from copper electrolysis. In the said method, the copper and tellurium of the sludge are first leached in an autoclave at high pressure and temperature. After pressure leaching, the sludge is further leached into hydrochloric acid by using chloride gas or hydrogen peroxide as the oxidant. Gold is separated by extraction from the obtained solution. After separating gold, the selenium contained in the solution is reduced by S02 gas. In this process step, also tellurium, gold residues and platinum metals are alloyed. Selenium is distilled from the obtained, precious metals bearing precipitate, and the distilling residue is returned to the process or processed outside the plant. The leaching residue from wet chlorination is processed further for recovering the lead and silver contained therein. After lead separation, the silver chloride from the precipitate is leached into an ammonia solution, reprecipitated as pure chloride and finally reduced into metallic silver.

In the publication Hoffman et al. Hydrometallurgy 94, 1994, pp. 69-107, there is introduced a method for processing anode sludge obtained from copper electrolysis. According to said method, copper and nickel are separated from anode sludge in an autoclave, at a high pressure and temperature. Then selenium is calcinated, and the metals are sulfatized in a calcination furnace. The obtained silver sulfate is converted into nitrate in a ball mill by means of calcium nitrate. Finally silver is separated electrolytically.

One of the disadvantages associated with the above arrangement is that some of the process steps are quite complicated and their control is difficult.

BRIEF DESCRIPTION OF THE INVENTION

An object of the present invention is thus to provide a method so as to overcome the above problems. The objects of the invention are achieved by a method and an arrangement, which are characterized by what is stated in the independent claims. The preferred embodiments of the invention are disclosed in the dependent claims.

The invention is based on the idea of a straightforward hydrometallurgical processing of anode sludge where no selenium calcination or slimes smelting is needed.

An advantageous feature of the method and arrangement of the present invention is that the new method makes use of such chemicals, for example sulfuric acid, that are normally used in an electrolytic copper refinery. This enables the recirculation of the solutions to the electrolysis or to the electrolyte purification. A remarkable reduction is achieved as regards to environmental emissions, because harmful gas emissions released from selenium calcination and slimes smelting are avoided. The total process delay is also cut.

BRIEF DESCRIPTION OF THE DRAWINGS

In the following the invention will be described in greater detail by means of preferred embodiments with reference to the drawings, in which FIG. 1 shows a flowchart of a first embodiment of the method of the present invention.

DETAILED DESCRIPTION OF THE INVENTION

The present invention provides a method of separating precious metals from anode sludge obtained from copper electrolysis.

In accordance with the present invention the method of separating precious metals from anode sludge obtained from copper electrolysis, comprises (a) leaching the anode sludge in an aqueous sulfuric acid solution to remove leachable chlorides and to obtain a first leaching residue depleted of chlorides;

(b) pressure leaching the first leaching residue to dissolve Ag and Se and to obtain a first filtrate comprising Ag and Se and a second leaching residue depleted of Ag and Se;

(c) leaching the second leaching residue with an aqueous hydrochloric acid solution to dissolve Au and platinum-group metals (PGMs) to obtain a second filtrate comprising Au and PGMs and a final leaching residue.

Typically the method further comprises, prior to step (c), (d) leaching the second leaching residue obtained from step (b) in an aqueous sulfuric acid solution to dissolve bismuth and optionally remaining silver, selenium and/or tellurium to obtain a third filtrate comprising Bi and optionally Ag, Se and/or Te and a further treated second leaching residue further depleted of at least Bi; and/or (e) leaching the second leaching residue obtained from step (b) or (d) in an aqueous hydrochloric acid solution to dissolve lead and optionally remaining selenium and/or tellurium to obtain a fourth filtrate comprising Pb, and optionally Se and/or Te and a still further treated second reaching residue further depleted of at least lead.

FIG. 1 shows a flowchart a first embodiment of separating precious metals from anode sludge obtained from copper electrolysis. Referring to FIG. 1 and in accordance with the invention anode sludge 1 obtained from the electrolytic refining of copper is introduced into a first leaching step (a) 101, wherein leachable chlorides are removed from the anode sludge.

In accordance with the present invention the anode sludge is a mixture of different compounds comprising copper (Cu), selenium (Se), precious metals and as impurities other metals and elements, such as lead (Pb). The anode sludge is obtained from the electrolytic refining of copper, and the composition of said raw material can vary. The copper content of the raw sludge can be over 30%. The silver (Ag) and selenium (Se) content of such sludge is typically about 5 to 10%, and its impurity contents (As, Sb, Bi, Pb, Te, Ni) are typically of the order of 1 to 5%.

Leaching in step (a) is accomplished in an aqueous sulfuric acid solution 10. The solution preferably contains from 50 to 150 g/L $H_2SO_4$. The leaching step (a) is accomplished under an elevated temperature, typically from 60 to 95° C., preferably from 80 to 90° C. The slurry density is typically less than 500 g/L, preferably from 200 to 300 g/L. Leaching in step (a) is advantageously performed under atmospheric pressure. Advantageously leaching in step (a) is performed under oxidizing conditions, preferably provided by an oxidizing agent 11, for oxidizing copper present in the anode sludge, but can also be performed without any oxidizing. Leaching of the anode sludge in an aqueous sulfuric acid solution in step (a) is performed to remove leachable chlorides from the anode sludge. The removal of leachable chlorides in step (a) reduces precipitation of silver chloride in further process steps and thus increases yield in silver recovery. Typically also some of the copper and arsenic comprised in the anode sludge are leached in this step. After filtration a chloride containing filtrate 19 and a first leaching residue 2 depleted of leachable chlorides is obtained. The first leaching residue 2 is then introduced into a pressure leaching step (b) 102.

The first leaching residue 2 obtained from step (a) and entering into the pressure leaching step (b) 102 is typically diluted to a slurry density of less than 300 g/L, preferably from 100 to 200 g/L depending on the silver concentration of the sludge. Leaching in step (b) is accomplished in an aqueous sulfuric acid solution 12. The leaching solution preferably contains from 200 to 500 g/L $H_2SO_4$. The pressure leaching step (b) is accomplished under an elevated temperature, typically more than 140° C., preferably from 160 to 170° C. Leaching is advantageously performed under an elevated pressure from 5 to 9 bar. In this step silver and selenium are solubilized and some impurities such as tellurium, arsenic, copper and nickel can be leached away.

An oxidizing agent 13 is used in the pressure leaching step (b) 102 to improve dissolution of silver and selenium. In a preferred aspect of the present invention the oxidizing agent 13 is oxygen or hydrogen peroxide, preferably oxygen.

If required the pressure leaching step (b) can be repeated one or more times, preferably one time, to ensure dissolution of silver and selenium.

After filtration a first filtrate 20 comprising silver and selenium and a second leaching residue 3 mostly depleted of silver and selenium is obtained. The first filtrate 20 typically also comprises tellurium. The obtained second leaching residue 3 is then introduced into either directly to leaching step (c) 105 or preferably to an optional leaching step (d) 103 and/or optional leaching step (e) 104.

When recovery of silver and/or selenium is desired, the method of the present invention further comprises recovering silver and, optionally, selenium from the first filtrate 20. The filtered solution obtained from step (a) 20, and optionally also a filtered solution 31 obtained from bismuth recovery 113, as discussed below, are introduced into a silver and selenium recovery step 112. Preferably the recovery of silver and selenium is accomplished by chloride precipitation and sulfur dioxide cementation. Silver is first precipitated by adding stoichiometric amount of hydrochloric acid. Metallic silver can be produced from silver chloride by known methods e.g. silver oxide precipitation followed by silver reduction. After silver precipitation selenium can be precipitated as elementary selenium by reduction with sulfur dioxide 70. When tellurium is present in the filtrate, practically no tellurium is reduced and precipitated by sulfur dioxide cementation. The filtrate 21 from the recovery of silver and selenium 112 can be further treated to recover tellurium from the filtrate in a tellurium recovery 122. Tellurium is preferably recovered from the filtrate by cementing with copper 71 into $Cu_2Te$ 61. The remaining solution 22 can be further treated in the electrolyte purification of copper electrolysis. Alternatively the recovery of silver and selenium can be accomplished for example by copper cementation with e.g. copper powder or copper chips or precipitation as silver selenide by using sulfur dioxide.

If desired the second leaching residue 3 can be subjected to an optional leaching step (d) and/or to an optional leaching step (e).

Leaching in step (d) is accomplished in an aqueous sulfuric acid solution 14. The leaching solution preferably contains from 400 to 900 g/L $H_2SO_4$. Typically the slurry density in step (d) is less than 400 g/L, preferably from 200 to 300 g/L. The leaching step (d) is accomplished under an elevated temperature, typically from 80 to 120° C., preferably from 90 to 110° C. Leaching in step (d) is advantageously performed under atmospheric pressure. Leaching step (d) mainly provides for dissolution of bismuth from the second leaching residue. However, also any remaining silver, selenium and/or tellurium will be leached.

After filtration, a third filtrate 30 and a further treated second leaching residue 4 depleted of Bi is obtained. The further treated second leaching residue 4 is then introduced either directly into a leaching step (c) 105 or preferably into a second optional leaching step (e) 104. The third filtrate 30 is preferably subjected bismuth recovery 133 to obtain bismuth sulfate 62 and a filtered solution 31 depleted of Bi.

The optional leaching step (e) 104 provides for removal of remaining impurities before silver and PGMs separation in step (c) 105. Leaching in step (e) is performed in an aqueous hydrochloric acid solution to obtain a fourth filtrate 40 comprising Pb, and optionally Se and Te, and a still further treated second reaching residue 5 further depleted of lead and any remaining Se and Te.

Leaching in step (e) is performed in the absence of an oxidant to ensure that gold and PGMs are not solubilized. The non-oxidative leaching in an aqueous solution of hydrochloric acid 15 is mainly utilized to dissolve lead. However, significant amount of any remaining selenium is also dissolved. Also remaining tellurium present in the second leaching residue 3 or in the further depleted second leaching residue 4 will be dissolved. Rest of the selenium is dissolved in oxidative hydrochloric acid leaching step (c) where main aim is to leach gold and PGMs.

After filtration, a fourth filtrate 40 and a still further treated second leaching residue 5 depleted of lead is obtained. The still further treated second leaching residue 5 is then introduced to a leaching step (c) 105.

When recovery of lead is desired, the method of the present invention additionally comprises recovering of lead from the fourth filtrate 40. Accordingly the filtered solution 40 is obtained from step (e) is introduced into a lead recovery step 114. Lead chloride 63 can be crystallized by temperature decrease.

When selenium and/or tellurium are present in the fourth filtrate 40 they can be recovered from the filtered solution obtained from the lead recovery. Accordingly the filtered solution 41 is introduced into a selenium and/or tellurium recovery step 124. Selenium and/or tellurium can be recovered e.g. by reduction with sulfur dioxide 72 as discussed above. The filtered solution 42 obtained from the recovery of selenium and/or tellurium 64 in step 124 can be further subjected to a neutralization step 125.

In the leaching step (c) the second treated leaching residue 3, the further treated second leaching residue 4, or the still further treated second leaching residue 5 is leached in an aqueous hydrochloric acid solution 16 to dissolve gold and platinum-group metals (PGMs) and to obtain a second filtrate 50 comprising Au and PGMs and a final leaching residue 6. The solution preferably contains from 150 to 250 g/L HCl. Typically the slurry density in step (c) is less than 500 g/L, preferably from 200 to 400 g/L. Leaching step (c) is typically accomplished under an elevated temperature, typically form 70 to 90° C., preferably from 75 to 85° C. Leaching in step (c) is advantageously performed under atmospheric pressure.

An oxidizing agent 17 is used in the leaching step (c) to improve dissolution of gold and PGMs. In a preferred aspect of the present invention the oxidizing agent 17 is hydrogen peroxide or chlorine, preferably hydrogen peroxide.

After filtration, a second filtrate 50 and a final leaching residue 6 is obtained.

When recovery of gold and/or platinum-group metals (PGMs) is desired, the method of the present invention further comprises recovering of Au and, optionally, PGMs from the second filtrate 50. The filtered solution 50 obtained from step (c) is introduced into the gold and PGMs recovery step 115. Preferably the recovery of gold is accomplished by reduction of gold e.g. by sulfur dioxide or ferrous chloride. Gold is advantageously reduced by treating the filtrate 50 with $SO_2$ gas, so that gold 65 is precipitated in two steps. In the first step, pure gold is precipitated. The impure gold obtained from the second step can be recycled back to the leaching step (c). Alternatively gold can be recovered by solvent extraction e.g. using dibutyl carbitol as an extractant. From the extraction solution gold can be directly reduced to gold powder. Precipitation of gold by $SO_2$ is preferred as it is a more economical and simpler method for recovering gold.

After recovery of gold, PGMs can be recovered. Preferably, the recovery of platinum-group metals is accomplished by cementation of PGMs. PGMs can be cemented by iron to obtain a mixture containing platinum-group metals. The filtrate 51 obtained from the recovery of Ag and PGMs is then typically subjected to a neutralization step 125, optionally together with the filtrate 42 obtained from the recovery of selenium and/or tellurium in step 124, to obtain a neutralized filtrate 52 and a neutralization residue 66.

EXAMPLES

Example 1

In this experiment, anode sludge was treated by the method of the present invention to leach and recover silver and selenium. Sludge containing 7.9% Ag, 7.9% Se, 1.9% Te, 23.1% Cu, 4.8 As, and 0.47% Cl was first leached in a sulfuric acid solution containing 100 g $H_2SO_4$/l at a temperature of 90° C. in a four liters reactor. Solids concentration in the start of leaching was 250 g/l and duration of leaching was 2 hours. After leaching residue was filtered, washed and analyzed together with the filtrate. Residue cake concentrations were 9.1% Ag, 8.8% Se, 1.8% Te, 13.2% Cu, 2.5 As, and 0.07% Cl. Filtrate contained 36.5 g Cu/L, 6.8 g As/L, 1.2 g Cl/L, 0.6 g Te/L, and 0.1 g Se/L and recovery of chloride was about 80%. Practically no silver was found from the solution.

Cake from atmospheric leaching was in the next stage leached at elevated temperature in an autoclave. Sulfuric acid concentration in the start was 250 g/L, temperature during pressure leaching 160° C. and total pressure 7 bars. Due to solubility limitations of silver sulfate in these circumstances solids concentration was 200 g/L. Oxygen was used as oxidizer and duration of leaching was 10 hours.

Progress in leaching was followed by taking slurry samples in every two hour. Only filtrate was analyzed. Finally leaching residue was filtered from the hot slurry and filter cake was washed with hot sulfuric acid solution and finally with hot water. Residue cake contained 1.1% Ag, 1.3% Se, 0.9% Te, 0.06% Cu, and 2.2% As and filtrate 19.7 g Ag/L, 20.3 g Se/L, 4.0 g Te/L, 30.9 g Cu/L, and 2.5 g As/L. Calculated leaching recoveries were 93% for silver, 92% for selenium, 80% for tellurium, 99.9% for copper, and 47% for arsenic.

Silver from the filtrate was precipitated as silver chloride by stoichiometric hydrochloric acid addition. After silver chloride precipitation selenium was precipitated at elevated temperature by sulfur dioxide and finally tellurium was cemented by using copper powder.

Sludge after pressure leaching contained 5.3% bismuth. For bismuth dissolution sludge was leached in sulfuric acid solution having 800 g $H_2SO_4$/L and solids concentration 250 g/L. Temperature during leaching was kept slightly above 100° C. After two hours leaching period slurry was filtered hot to prevent problems due to crystallization of bismuth sulfate during filtration. Final bismuth concentration in the filtrate at the leaching temperature was 6.4 g/L. Also some silver, selenium, tellurium and arsenic were leached at this stage and washed residue contained 0.8% Ag, 0.4% Se, 0.6% Te, 2.2% As, and 2.1% Bi. Achieved bismuth concentration in the filtrate tells that by lowering solids concentration in the start even more bismuth can be leached.

Recoveries over the three leaching stages were 96.2% for silver, 98.1% for selenium, 89.1% for tellurium, 82.9% for arsenic, and 70.9% for bismuth based on analyses, weights and volumes of residues and filtrates.

Example 2

In this experiment anode sludge was first leached in sulfuric acid to remove soluble chlorides and then pressure leached to recover silver, selenium, copper and nickel according to Example 1.

Residue from pressure leaching containing 1.1% Ag, 0.3% Se, 0.6% Te, 0.5% As, 2.9% Sb, 1.9% Bi, and 4.8% Pb was first leached in hydrochloric acid solution containing 100 g HCl/L at a temperature of 85° C. Aim of the experiment was to leach lead and solids concentration was 100 g/L because of the limited lead chloride solubility. Duration of leaching was three hours and no oxidant was used. After leaching slurry was filtered, cake washed and analyzed together with filtrate. Residue cake contained 1.2% Ag, 0.14% Se, 0.5% Te, 0.5% As, 2.5% Sb, 1.4% Bi, and 0.4% Pb. Lead concentration in the filtrate was 4.2 g/L and selenium and tellurium concentrations 0.12 and 0.14 g/L. Analyzed gold concentration was 30 mg/L. Selenium, tellurium and gold were precipitated from filtrate by sulfur dioxide before cooling of the solution and lead chloride crystallization.

In the next stage main aim was to leach gold from the residue and leaching was made using hydrogen peroxide as oxidant. Because the amount of residue was small and the volume of slurry was wanted to be moderate (500 ml) solids concentration was only 150 g/L. Hydrochloric acid concentration in leaching was 200 g/L, solution temperature 80° C. and leaching period 3 hours. 80 ml of hydrogen peroxide was fed into the slurry during the first two hours. After leaching hot slurry was filtered, cake washed and analyzed together with filtrate. Cake contained 0.7 ppm Au, 0.07% Pb, 0.12% Bi, and 0.18% Sb. This final cake was mainly barium sulfate containing a small amount e.g. silver. Concentrations in the filtrate were 1.2 g Au/L, 1.3 g Pb/L, 2.7 g Bi/L, and 4.7 g Sb/L. Also some selenium, tellurium and arsenic were found. Calculated gold recovery was about 100%. Because of the low PGMs concentration in the sludge they were not analyzed in this experiment, but as proved in practice also their recovery is high in oxidative hydrochloric acid leaching.

It will be obvious to a person skilled in the art that, as the technology advances, the inventive concept can be implemented in various ways. The invention and its embodiments are not limited to the examples described above but may vary within the scope of the claims.

The invention claimed is:

1. A method of separating precious metals from anode sludge obtained from copper electrolysis, comprising
   (a) leaching the anode sludge in an aqueous sulfuric acid solution to remove leachable chlorides and to obtain a first leaching residue depleted of chlorides;
   (b) pressure leaching the first leaching residue to dissolve Ag and Se and to obtain a first filtrate comprising Ag and Se and a second leaching residue depleted of Ag and Se;
   (c) leaching the second leaching residue with an aqueous hydrochloric acid solution to dissolve Au and platinum-group metals (PGMs) to obtain a second filtrate comprising Au and PGMs and a final leaching residue.

2. The method as claimed in claim 1, wherein, prior to step (c), the method comprises
   (d) leaching the second leaching residue obtained from step (b) in an aqueous sulfuric acid solution to dissolve bismuth and optionally remaining silver, selenium and/or tellurium to obtain a third filtrate comprising Bi and optionally Ag, Se and/or Te and a further treated second leaching residue further depleted of at least Bi; and/or
   (e) leaching the second leaching residue obtained from step (b) or (d) in an aqueous hydrochloric acid solution to dissolve lead and optionally remaining selenium and/or tellurium to obtain a fourth filtrate comprising Pb, and optionally Se and/or Te and a still further treated second reaching residue further depleted of at least lead.

3. The method as claimed in claim 1, wherein leaching in step (a) is performed under oxidizing conditions for oxidizing copper present in the anode sludge.

4. The method as claimed in claim 1, further comprising recovering Ag and Se from the first filtrate.

5. The method as claimed in claim 4, wherein the recovery of Ag and Se is accomplished by sulfur dioxide cementation.

6. The method as claimed in claim 4, wherein the recovery of Ag is accomplished by silver chloride precipitation.

7. The method as claimed in claim 1, further comprising recovering of Au and PGMs from the second filtrate.

8. The method as claimed in claim 7, wherein the recovery of Au is accomplished by reduction of gold.

9. The method as claimed in claim 7, wherein the recovery of PGMs is accomplished by cementing of PGM.

10. The method as claimed in claim 1, wherein leaching step (a) is accomplished under an elevated temperature from 60 to 95° C., and under atmospheric pressure.

11. The method as claimed in claim 1, wherein leaching step (b) is accomplished under an elevated temperature, more than 140° C., and under an elevated pressure from 5 to 9 bar.

12. The method as claimed in claim 1, wherein leaching step (c) is accomplished under an elevated temperature, from 70 to 90° C., and under atmospheric pressure.

13. The method as claimed in claim 1, wherein an oxidizing agent, selected from oxygen or hydrogen peroxide, used in the pressure leaching step (b).

14. The method as claimed in claim 1, wherein leaching in step (b) is accomplished in an aqueous sulfuric acid solution.

15. The method as claimed in claim 1, wherein an oxidizing agent, selected from hydrogen peroxide or chlorine, is used in the leaching step (c).

16. The method as claimed in claim 1, wherein leaching step (a) is accomplished under an elevated temperature from 80 to 90° C. and under atmospheric pressure.

17. The method as claimed in claim 1, wherein leaching step (b) is accomplished under an elevated temperature from 160 to 170° C. and under an elevated pressure from 5 to 9 bar.

18. The method as claimed in claim 1, wherein leaching step (c) is accomplished under an elevated temperature from 75 to 85° C. and under atmospheric pressure.

19. The method as claimed in claim 1, wherein oxygen is used as an oxidizing agent in the pressure leaching step (b).

20. The method as claimed in claim 1, wherein leaching in step (b) is accomplished in an aqueous solution containing from 200 to 500 g/L $H_2SO_4$.

21. The method as claimed in claim 1, wherein hydrogen peroxide is used as an oxidizing agent in the leaching step (c).

* * * * *